(12) United States Patent
Krüger et al.

(10) Patent No.: US 8,315,451 B2
(45) Date of Patent: Nov. 20, 2012

(54) METHOD FOR SEGMENTATION OF AN MRI IMAGE OF A TISSUE IN PRESENCE OF PARTIAL VOLUME EFFECTS AND COMPUTER PROGRAM IMPLEMENTING THE METHOD

(75) Inventors: Gunnar Krüger, Lausanne (CH); Bénédicte Mortamet, Lausanne (CH)

(73) Assignee: Siemens Schweiz Aktiengesellschaft, Zurich (CH)

( * ) Notice: Subject to any disclaimer, the term of this patent is extended or adjusted under 35 U.S.C. 154(b) by 824 days.

(21) Appl. No.: 12/486,077

(22) Filed: Jun. 17, 2009

(65) Prior Publication Data
US 2009/0324046 A1 Dec. 31, 2009

(30) Foreign Application Priority Data
Jun. 17, 2008 (EP) ..................................... 08010959

(51) Int. Cl.
*G06K 9/00* (2006.01)
(52) U.S. Cl. ........ 382/131; 382/128; 382/173; 382/298; 382/299; 382/300
(58) Field of Classification Search ......................... None
See application file for complete search history.

(56) References Cited

U.S. PATENT DOCUMENTS
4,908,573 A * 3/1990 Kaufman et al. ............. 324/309
2002/0015517 A1 2/2002 Hwang et al.

OTHER PUBLICATIONS

Leemput et al., A Unifying Framework for Partial Volume Segmentation of Brain MR Images, Jan. 2003 IEEE, vol. 22, No. 1.*
Wu, et al.: "Extraction of Subvoxel Resolution Trabecular Bone Architecture from NMR Microscopy", XP-000462652, pp. 1682-1686, Oct. 30, 1993, Philadelphia, PA.
Salvado, et al: "Partial Volume Reduction by Interpolation with Reverse Diffusion", Hindawi Publishing Corporation, International Journal of Biomedical Imaging, vol. 2006, Article ID 92092, XP-002493154, pp. 1-13, Nov. 27, 2005.
Ruan, et al: "Brain Tissue Classification of Magnetic Resonance Images Using Partial Volume Modeling", IEE Transactions on Medical Imaginging, vol. 19, No. 12, Dec. 2000, XP-001003258, pp. 1179-1187.
Saloner, et al: "Image and Object Registry and Connected Voxel Algorithms for Display of MRA Vessel Signal", supplied by the British Library, XP-008095808, p. 475,1991, U.K.

(Continued)

*Primary Examiner* — Matthew Bella
*Assistant Examiner* — Jason Heidemann
(74) *Attorney, Agent, or Firm* — Laurence A. Greenberg; Werner H. Stemer; Ralph E. Locher

(57) ABSTRACT

A method and computer program for segmentation of an MRI image of tissue in presence of partial volume effects, include storing the MRI image in K-space representation as raw dataset, reconstructing N images, each represented by N sets of voxels and N sets of light intensity values, dividing each voxel into a fixed number of subvoxels equal in size, assigning the light intensity value of the voxel to its subvoxels, classifying each subvoxel according to light intensity value, identifying a totality of subvoxels classified with equal probability for a totality of tissue types, labeling the subvoxels as partial volume subvoxels, shifting N−1 images starting with the second image by one subvoxel relatively to the preceding image and gene-rating a new set of overlay subvoxels, determining a new set of probability values for the new set of overlay subvoxels and creating an overlay image of the new set of overlaid subvoxels.

6 Claims, 4 Drawing Sheets

OTHER PUBLICATIONS

Du, et al: "Reduction of Partial-Volume Artifacts with Zero-Filled Interpolation in Three-Dimensional MR Angiography", JMRI Original Research, XP-002493153, pp. 733-741, Sep./Oct. 1994.

Kramer, et al: "Applications of Voxel Shifting in Magnetic Resonance Imaging", Toshiba America MRI and University of California Radiologic Imaging Laboratory, XP-008095677, California, pp. 1305-1310, Jun. 13, 1990.

Hylton, et al: "Impact of Section Doubling on MR Angiography", Radiologic Imaging Lab. California University, Journal Paper, Inspec/IEE, XP-002493155, p. 1, published in Dec. 1992.

* cited by examiner

| 1 | 1 | 1 | 1 | 0.5 | 0.5 | 0.5 | 0.5 |
|---|---|---|---|---|---|---|---|
| 1 | 1 | 1 | 1 | 0.5 | 0.5 | 0.5 | 0.5 |
| 1 | 1 | 0.5 | 0.5 | 0.5 | 0.5 | 0 | 0 |
| 1 | 1 | 0.5 | 0.5 | 0.5 | 0.5 | 0 | 0 |
| 1 | 1 | 0.5 | 0.5 | 0 | 0 | 0 | 0 |
| 1 | 1 | 0.5 | 0.5 | 0 | 0 | 0 | 0 |
| 0.5 | 0.5 | 0 | 0 | 0 | 0 | 0 | 0 |
| 0.5 | 0.5 | 0 | 0 | 0 | 0 | 0 | 0 |

FIG. 2

| 1 | 1 | 0.5 | 0.5 | 0.5 | 0.5 | 0.5 | 0.5 |
|---|---|---|---|---|---|---|---|
| 1 | 1 | 0.5 | 0.5 | 0.5 | 0.5 | 0.5 | 0.5 |
| 1 | 1 | 0.5 | 0.5 | 0 | 0 | 0 | 0 |
| 1 | 1 | 0.5 | 0.5 | 0 | 0 | 0 | 0 |
| 0.5 | 0.5 | 0 | 0 | 0 | 0 | 0 | 0 |
| 0.5 | 0.5 | 0 | 0 | 0 | 0 | 0 | 0 |
| 0.5 | 0.5 | 0 | 0 | 0 | 0 | 0 | 0 |
| 0.5 | 0.5 | 0 | 0 | 0 | 0 | 0 | 0 |

FIG. 3

| | 1 | 1 | 1 | 0.5 | 0.5 | 0.5 | 0.5 |
|---|---|---|---|---|---|---|---|
| | 1 | 1 | 1 | 0.5 | 0.5 | 0.5 | 0.5 |
| | 1 | 0.5 | 0.5 | 0.5 | 0.5 | 0 | 0 |
| | 1 | 0.5 | 0.5 | 0.5 | 0.5 | 0 | 0 |
| | 1 | 0.5 | 0.5 | 0 | 0 | 0 | 0 |
| | 1 | 0.5 | 0.5 | 0 | 0 | 0 | 0 |
| | 0.5 | 0 | 0 | 0 | 0 | 0 | 0 |
| | 0.5 | 0 | 0 | 0 | 0 | 0 | 0 |

FIG. 4

| 1 | 1 | 0.5 | 0.5 | 0.5 | 0.5 | 0.5 | |
|---|---|---|---|---|---|---|---|
| 1 | 1 | 0.5 | 0.5 | 0.5 | 0.5 | 0.5 | |
| 1 | 1 | 0.5 | 0 | 0 | 0 | 0 | |
| 1 | 1 | 0.5 | 0 | 0 | 0 | 0 | |
| 0.5 | 0.5 | 0 | 0 | 0 | 0 | 0 | |
| 0.5 | 0.5 | 0 | 0 | 0 | 0 | 0 | |
| 0.5 | 0.5 | 0 | 0 | 0 | 0 | 0 | |
| 0.5 | 0.5 | 0 | 0 | 0 | 0 | 0 | |

FIG. 5

| 1 | 1 | 0.75 | 0.5 | 0.5 | 0.5 | 0.5 |
|---|---|---|---|---|---|---|
| 1 | 1 | 0.75 | 0.5 | 0.5 | 0.5 | 0.5 |
| 1 | 0.75 | 0.5 | 0.5 | 0.25 | 0 | 0 |
| 1 | 0.75 | 0.5 | 0.5 | 0.25 | 0 | 0 |
| 0.75 | 0.5 | 0.25 | 0 | 0 | 0 | 0 |
| 0.75 | 0.5 | 0.25 | 0 | 0 | 0 | 0 |
| 0.5 | 0.25 | 0 | 0 | 0 | 0 | 0 |
| 0.5 | 0.25 | 0 | 0 | 0 | 0 | 0 |

FIG. 6

METHOD FOR SEGMENTATION OF AN MRI IMAGE OF A TISSUE IN PRESENCE OF PARTIAL VOLUME EFFECTS AND COMPUTER PROGRAM IMPLEMENTING THE METHOD

CROSS-REFERENCE TO RELATED APPLICATION

This application claims the priority, under 35 U.S.C. § 119, of European Patent Application EP 08 010 959.8, filed Jun. 17, 2008; the prior application is herewith incorporated by reference in its entirety.

BACKGROUND OF THE INVENTION

Field of the Invention

The invention relates to a method for segmentation of an MRI image of a tissue in the presence of partial volume effects, especially for different types of brain tissue. The invention also relates to a computer program for implementing the method.

Brain tissue classification approaches generally deal with the problem of partial volume effects by modeling distributions of different types of tissue with appropriately chosen probability density functions. Partial volumes are mixtures of different types of tissue. They are characterized in that equal probabilities for different types of tissue are determined in a tissue area. For example, it may be determined that a certain voxel contains two different types of tissue.

Segmentation refers to a process of partitioning a digital image into multiple regions of pixels, in case of a two-dimensional image, and multiple regions of voxels, in case of a three-dimensional image. A voxel is a tiny volume, in other words a three-dimensional pixel. The goal of segmentation is to simplify or to change a representation of the image to a form which is easier to analyze. It is typically used to locate objects and boundaries in the image. Image segmentation is used in many fields such as satellite imaging, face recognition, fingerprint recognition, automatic traffic controlling system and magnetic resonance tomography. Often image segmentation techniques have to be combined with domain knowledge in order to effectively solve an image segmentation problem for a certain domain.

Van Leemput et al. describe an algorithm for tackling the problem of partial volume segmentation of brain MR images ("A Unifying Framework for Partial Volume Segmentation of Brain MR Images", IEEE Trans. Med. Imag., vol. 22, no. 1, pp. 105-119, January 2003). The method is a natural extension of the usual Expectation Maximization (EM) framework, widely used to classify brain MR images into pure tissue type. It estimates the relative amounts of various tissue types in each voxel (rather than simply assigning each voxel to one single tissue) by including a down sampling step that accounts for partial volumes along borders between tissues. They then derive the EM algorithm to simultaneously estimate the parameters of the resulting model and perform a partial volume classification. S. Ruan et al. present a method based on a modified Markov Random Field (MRF) classification of partial volumes. A third term is added into an energy function of that approach, whereby the third term deals with a problem of very low contrast in partial volumes. The third term is obtained by multi fractal analysis and aims to provide local information about gray level variation ("Brain Tissue Classification of Magnetic Resonance Correction of MR Images of the Brain", IEEE Trans. Med. Imag., vol. 19, no. 12, December 2000).

The certain classes mentioned further above are divided into so-called pure classes and mixture classes. They classify the brain tissue into the pure classes: gray matter, white matter and cerebrospinal fluid and the mixture classes: gray matter/white matter, gray matter/cerebrospinal fluid. That classification is used to determine a membership of a certain voxel to one of the classes. The most important parameter in such a classification is a light intensity value corresponding to each voxel, of an acquired image.

Both methods described above rely on the selection of an appropriate spatial model, which remains a challenging task. The model presented by Van Leemput only allows partial volume voxels at the interface between two tissues and lacks the possibility to describe such structures as the deep gray matter where white and gray matters truly mix without interface.

Ruan's MRF approach does not provide adequate spatial information, particularly in gray nuclei.

SUMMARY OF THE INVENTION

It is accordingly an object of the invention to provide an improved method for segmentation of tissue by reducing partial volumes and a computer program for implementing the method, which overcome the hereinafore-mentioned disadvantages of the heretofore-known methods and programs of this general type and which thus minimize a number of voxels in data with partial volumes.

With the foregoing and other objects in view there is provided, in accordance with the invention, a method for segmentation of an MRI image of a tissue in the presence of partial volume effects, comprising the steps of:

a) storing the MRI image in a K-space representation as a raw dataset, the dataset including coordinates of a totality of voxels and a totality of related light intensity values of the tissue;

b) reconstructing a number N of images, each represented by N individual sets of voxels and N individual sets of light intensity values respectively, the number N being higher than or equal to 2;

c) dividing each voxel of the N sets of voxels into a fixed number of sub voxels equal in size and assigning the light intensity value of the voxel to its sub voxels;

d) performing a classification of each sub voxel according to its light intensity value, the classification yielding a probability value for a presence of at least one predetermined tissue type at a location of the sub voxel;

e) identifying a totality of particular sub voxels classified with an equal probability for each one of a totality of the tissue types and labeling the particular sub voxels as partial volume sub voxels;

f) shifting each of N−1 images starting with the second image by one sub voxel relatively to the preceding image and generating a new set of overlay sub voxels;

g) determining a new set of probability values for the new set of overlay sub voxels by building for each overlay sub voxel an average mean of the probability values of all corresponding overlaid sub voxels of the N images; and h) creating an overlay image composed of the new set of overlaid sub voxels.

A formalism widely used as a basis for further processing of magnetic resonance images is a representation of acquired data in the so-called k-space. The k-space is a temporary image space in which data from digitized MR signals are stored during image acquisition. As soon as a full scan has been made, the k-space holds the raw data describing a complete image, in which the raw data is a starting point for further processing, for example image reconstruction. The k-space is a representation of the data in a spatial frequency domain. The data contains Cartesian coordinate system location values for each voxel in an encoded way, as well as the corresponding light intensity value. In order to retrieve a real image represented in the Cartesian coordinate system, a Fourier transformation is applied to the encoded data. In order to apply the method presented in this invention, only a single MR image acquisition is needed. The image is reproduced N times by applying a Fourier transformation to the raw data of the k-space. The more image reproductions are generated, the higher is the precision of the result.

The fixed number of reproduced images is used to divide each of the voxels into equal so-called sub voxels, which are assigned the intensity value of the voxel itself. The sub voxels undergo a first classification, which is done by comparing their light intensity values with predefined values of the classes mentioned further above. This advantageously allows a first sieving of voxels which are found to have a high probability of belonging to one of the classes. After that, the particular voxels which have been identified as partial volumes are labeled for further investigations. In order to further minimize a number of partial volumes, each of the N−1 images are shifted with respect to each other by one sub voxel in each direction of the coordinate system. A first image is chosen, which is not shifted, and each subsequent image is shifted with respect to a preceding image. Thus, except for a row of sub voxels of the first image in each direction of the coordinate system, all other sub voxels are overlaid with sub voxels of following images. One way to accomplish the shift, in other words a sub-sampling, is for example to perform a linear phase change in the k-space. By shifting the N−1 images and correspondingly tissue borders, the partial volumes are modulated, which allows a more precise determination of the tissue borders. Probability maps, as a result of the shifting, are up-sampled and aligned, without interpolation, to significantly reduce the partial volumes and hence refine the tissue borders.

The main advantage of the proposed method is an improved segmentation, which translates into a better accuracy in tissue determination, used for example for brain tissue volumetric measurements. A further advantage is that a scan time is not affected by the method because the reconstructions are carried out from one single MR scan. Yet another advantage is that the tissue classification is based on the raw data, whereas multispectral methods rely on interpolated data. Therefore, by avoiding interpolation, blurring of voxels on boundaries between different tissue types is avoided, which is fundamental for tissue delineation.

In accordance with another mode of the invention, the fixed number is set to be equal to the number N raised to the power three. Advantageously, the fixed number is chosen to be equal to the number N of the image reproductions. This assures that a complete image is investigated and thus it is avoided on one hand that the shifting as described above crosses a voxel boundary and on the other hand that only a part of each voxel is covered by the method.

In accordance with a further mode of the invention, the shifting is performed in an x-direction, a y-direction and a z-direction of a coordinate system. Since the voxels are volume entities, a three-dimensional shift is preferable. However, the method is equally applicable in a two-dimensional space.

In accordance with an added mode of the invention, the classification is performed by matching the light intensity value for each of the sub voxels to a reference light intensity value of one of the predetermined tissue types. As mentioned above, the classes of tissue are used to identify a nature of the tissue represented by a certain voxel.

In accordance with an additional mode of the invention, an interpolation of any value of the new set of probability values is avoided. This advantageously avoids uncertainness and an induction of further incertitude which is a property of an interpolation. Only real existing data is used in this method.

With the objects of the invention in view, there is concomitantly provided a computer program used to implement the method.

Other features which are considered as characteristic for the invention are set forth in the appended claims.

Although the invention is illustrated and described herein as embodied in a method for segmentation of an MRI image of a tissue in the presence of partial volume effects and a computer program for implementing the method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 2 is a probability map of a first reconstructed image;

FIG. 3 is a probability map of a second reconstructed image;

FIG. 4 is a probability map of a first reconstructed image after shifting;

FIG. 5 is a probability map of a shifted second reconstructed image; and

FIG. 6 is a probability map of a combination of the first and the second reconstructed images.

DETAILED DESCRIPTION OF THE INVENTION

Figure 1:
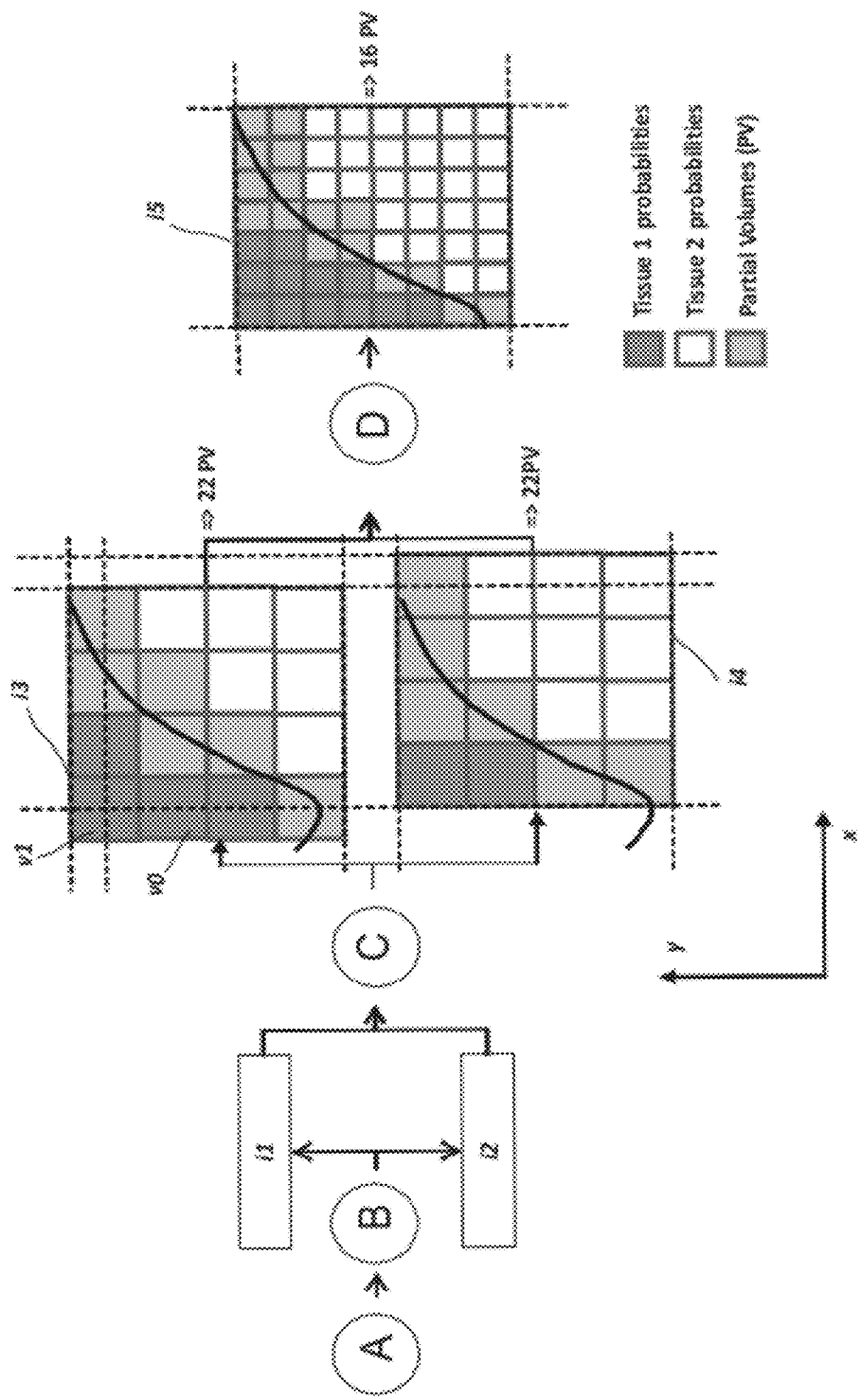
FIG. 1 is a two-dimensional example of an implementation of the method with a one dimensional shift of two reconstructed images.

Referring now to the figures of the drawings in detail and first, particularly, to FIG. 1 thereof, there is seen an example of an implementation of the method according to the invention with a shifting of two reconstructed images. In this example, emphasis is placed upon the shifting and for reasons of clarity a one dimensional shifting in x-direction is used.

After an MRI acquisition A, the raw data is reconstructed B two times, yielding a first image i1 and a second image i2. A first brain tissue classification C is carried out whereby the first and the second images are shown in a first and a second voxel representation i3 and i4, respectively. In these representations, dark gray squares are voxels with a high tissue 1 probability, white squares are voxels with a high tissue 2 probability and light gray squares are voxels denoting partial volumes. Each voxel, for example voxel v0, is split into 4 equal sub voxels of the same size like an example sub voxel v1. The dotted lines represent a shifting of the second voxel representation i4 by one sub voxel in x direction with respect to the voxel representation i3. After carrying out a combination of probabilities D, a new representation of overlaid voxels i5 is obtained. Both representations i3 and i4 contain each 22 partial volumes counted in numbers of sub voxels. It is noted that only the overlaid sub voxels being partial volumes are taken into account, thus 2 partial volume sub voxels of the first column of i3 and 2 partial volume sub voxels of the last column of i4 are ignored in this example. The overlaid representation i5, which shows only the overlaid part of the image, contains only 16 partial volumes, thus a reduction of partial volumes of about 27% has been obtained.

The combination of probabilities will be explained in more detail with regard to FIGS. 2 to 6.

FIG. 2 shows an example of probabilities associated with each pixel for the first pixel representation i3 in a form of a first probability map. The partial volumes have a probability of 0.5, or a 50% probability for the tissue 1 and a 50% probability for the tissue 2. It is noted that, in the following, a probability value lower than 0.5 means a higher probability of the presence of the tissue 2 and a value higher than 0.5 means a higher probability of the presence of the tissue 1 at a location of a corresponding voxel.

FIG. 3 shows an example of probabilities associated with each pixel for the second pixel representation i4 in a form of a second probability map.

FIG. 4 shows an example of probabilities associated with each pixel for the first pixel representation i3 after shifting the second pixel representation i4 with respect to i3, in a form of a third probability map. For reasons of clarity, the shifting is represented by removing the first column from the first probability map of FIG. 2.

FIG. 5 shows an example of probabilities associated with each pixel for the second pixel representation i4 after being shifted, in a form of a fourth probability map. For reasons of clarity, the shifting is represented by removing the last column from the second probability map of FIG. 3.

FIG. 6 shows an example of probabilities associated with each pixel for a combination of the third and the fourth probability map, in a form of a fifth probability map for an overlaid image area. Taking as an example a pixel in the first column and fifth row, its probability value is determined by overlaying a pixel in the fifth row and second column of the third probability map, having a value of 1, with a pixel in the fifth row and first column of the fourth probability map, having a value of 0.5. Thus, an average of the two values yields 0.75. Because this value is higher than 0.5, the pixel is assigned to tissue 1.

The invention claimed is:

1. A method for segmentation of an MRI image of a tissue in presence of partial volume effects, the method which comprises the following steps:

a) storing the MRI image in a K-space representation as a raw dataset, the dataset including coordinates of a totality of voxels and a totality of related light intensity values of the tissue;

b) reconstructing a number N of images, each respectively represented by N individual sets of voxels and N individual sets of light intensity values, with the number N being greater than or equal to 2;

c) dividing each voxel of the N sets of voxels into a fixed number of sub voxels being equal in size and assigning the light intensity value of the voxel to its sub voxels;

d) performing a classification of each sub voxel according to its light intensity value, the classification yielding a probability value for a presence of at least one predetermined tissue type at a location of the sub voxel;

e) identifying a totality of particular sub voxels classified with an equal probability for each one of a totality of the tissue types and labeling the particular sub voxels as partial volume sub voxels;

f) shifting each of N−1 images starting with the second image by one sub voxel relatively to a preceding image and generating a new set of overlay sub voxels;

g) determining a new set of probability values for the new set of overlay sub voxels by building for each overlay sub voxel an average mean of the probability values of all corresponding overlaid sub voxels of the N images; and h) creating an overlay image composed of the new set of overlaid sub voxels.

2. The method according to claim 1, which further comprises setting the fixed number to be equal to the number N raised to the power three.

3. The method according to claim 1, which further comprises performing the shifting step in an x-direction, a y-direction and a z-direction of a coordinate system.

4. The method according to claim 1, which further comprises performing the classification step by matching the light intensity value for each of the sub voxels to a reference light intensity value of one of the predetermined tissue types.

5. The method according to claim 1, which further comprises avoiding an interpolation of any value of the new set of probability values.

6. A computerized method for segmentation of an MRI image of a tissue in presence of partial volume effects, the method which comprises the following steps:

carrying out computer-readable instructions for performing the method steps according to claim 1, when loaded into a computer.

* * * * *